(12) United States Patent  
Chou

(10) Patent No.: US 8,922,528 B2  
(45) Date of Patent: Dec. 30, 2014

(54) OPTICAL TOUCH DEVICE WITHOUT USING A REFLECTIVE FRAME OR A NON-REFLECTIVE FRAME

(75) Inventor: Chia-Te Chou, New Taipei (TW)

(73) Assignee: Winston Corporation, Hsinchih, New Taipei (TW)

( * ) Notice: Subject to any disclaimer, the term of this patent is extended or adjusted under 35 U.S.C. 154(b) by 233 days.

(21) Appl. No.: 13/604,611

(22) Filed: Sep. 5, 2012

(65) Prior Publication Data

US 2013/0106784 A1  May 2, 2013

(30) Foreign Application Priority Data

Oct. 28, 2011  (TW) .............................. 100139424 A

(51) Int. Cl.  
  *G06F 3/042*  (2006.01)
(52) U.S. Cl.  
  CPC .............. *G06F 3/042* (2013.01); *G06F 3/0421* (2013.01)  
  USPC ...................................... 345/175; 178/18.09
(58) Field of Classification Search  
  CPC .................................................. G06F 3/0421  
  USPC ....................................... 345/175; 178/18.09  
  See application file for complete search history.

(56) References Cited

U.S. PATENT DOCUMENTS

| | | | | |
|---|---|---|---|---|
| 4,692,809 | A * | 9/1987 | Beining et al. | 345/175 |
| 5,598,527 | A * | 1/1997 | Debrus et al. | 345/173 |
| 2002/0158838 | A1* | 10/2002 | Smith et al. | 345/156 |
| 2002/0162949 | A1* | 11/2002 | Iwamoto et al. | 250/221 |
| 2004/0218479 | A1* | 11/2004 | Iwamoto et al. | 369/124.15 |
| 2005/0012723 | A1* | 1/2005 | Pallakoff | 345/173 |
| 2005/0200613 | A1* | 9/2005 | Kobayashi et al. | 345/175 |
| 2006/0238517 | A1* | 10/2006 | King et al. | 345/173 |
| 2007/0046646 | A1* | 3/2007 | Kwon et al. | 345/173 |
| 2010/0053861 | A1* | 3/2010 | Kim et al. | 361/679.01 |
| 2010/0134424 | A1* | 6/2010 | Brisebois et al. | 345/173 |
| 2010/0214270 | A1* | 8/2010 | Lai et al. | 345/175 |
| 2011/0242033 | A1* | 10/2011 | Kim et al. | 345/173 |

OTHER PUBLICATIONS

Office action mailed on Mar. 28, 2014 for the Taiwan application No. 100139424, filing date Oct. 28, 2011, p. 1 line 12-14 and p. 2 line 1-9.

* cited by examiner

*Primary Examiner* — Adam J Snyder  
(74) *Attorney, Agent, or Firm* — Winston Hsu; Scott Margo

(57) ABSTRACT

An optical touch device includes a display panel whereon a coordinate detecting area is formed, at least one optical transceiver disposed on a corner of the display panel for transceiving a plurality of beams travelling along an edge of the coordinate detecting area so as to form an optical virtual frame, at least one image capturing module disposed on a corner of the display panel for capturing surroundings of an object, and a control module coupled to the at least one image capturing module for determining whether to calculate a coordinate value of the object according to whether the object blocks the optical virtual frame by the captured surroundings of the object.

20 Claims, 7 Drawing Sheets

OPTICAL TOUCH DEVICE WITHOUT USING A REFLECTIVE FRAME OR A NON-REFLECTIVE FRAME

BACKGROUND OF THE INVENTION

1. Field of the Invention

The present invention relates to an optical touch device, and more specifically, to an optical touch device without using a reflective frame or a non-reflective frame.

2. Description of the Prior Art

In the modern consumer electronic products, a portable electronic product such as a personal digital assistant, a smart phone or a mobile phone is equipped with a touch control device as an interface for data transmission. Since consumer electronic products have become lighter, thinner, shorter and smaller, there is no space on these products for containing a conventional input device, such as a mouse, a keyboard and so on. Furthermore, with development of tablet computers focusing on humanity design, a display with the touch control device has gradually become one of the key components in various electronic products. A variety of touch control technologies, such as a resistive type, a capacitive type, an ultrasonic type, an infrared type, an optical imaging type and so on have been developing. Due to consideration for technology level and cost, the above-mentioned touch control technologies have been implemented in various fields.

For example, principle of the optical imaging design is to utilize two image capturing modules located at two corners of the display for detecting a position of an object on the display. Then, the position of the object on the display is calculated by triangulating location. Thus, compared with the conventional resistive type or capacitive type touch device, it has advantages of accuracy, high penetration, good stability, low damage rate, low cost and being capable of multi-touch, and the optical imaging design is overwhelmingly advantageous in the large-size display market. However, the conventional interrupting or imaging optical touch device needs a reflective frame or a non-reflective frame to provide the object with a background when the object is located within the coordinate detecting area, so as to isolate interference outside the coordinate detecting area. If there is a touch object on the coordinate detecting area, it will block the frame so that a sensor can sense a shadow for deriving a touch position from a shadow position.

In other words, the substantial frame is to provide functions of isolating the outside interference and being a background for the touch object. However, the substantial frame needs to be on the same plane with the sensor, resulting in difficulty in assembly and increasing manufacturing cost. But the conventional optical touch device without the substantial frame can not determine a touch point precisely due to the interference outside the coordinate detecting area. As a result, design of an optical touch device for effectively decreasing assembly difficulties and cost and for increasing determining accuracy is an important issue of the touch technology.

SUMMARY OF THE INVENTION

The present invention is to provide an optical touch device without using a reflective frame or a non-reflective frame to solve above problems.

According to the disclosure, an optical touch device includes a display panel whereon a coordinate detecting area is formed, at least one optical transceiver disposed on a corner of the display panel for transceiving a plurality of beams travelling along an edge of the coordinate detecting area so as to form an optical virtual frame, at least one image capturing module disposed on a corner of the display panel for capturing surroundings of an object, and a control module coupled to the at least one image capturing module for determining whether to calculate a coordinate value of the object according to whether the object blocks the optical virtual frame by the captured surroundings of the object.

According to the disclosure, the at least one optical transceiver is a laser transceiver or an infrared transceiver for transceiving straight light beams.

According to the disclosure, the optical touch device further includes at least one optical filter unit disposed on a position corresponding to the at least one image capturing module for filtering beams traveling into the at least one image capturing module so that the at least one image capturing module captures the beams with the same wavelength as a wavelength of the beams emitted from the at least one optical transceiver.

According to the disclosure, the control module calculates the coordinate value of the object when the control module determines that the object blocks the optical virtual frame.

According to the disclosure, the optical touch device further includes at least one reflective optical unit disposed on an optical path of the optical virtual frame for reflecting the beams emitted from the at least one optical transceiver back to the at least one optical transceiver.

According to the disclosure, the optical touch device includes two optical transceivers disposed on the corner of the display panel for transceiving the plurality of beams travelling in parallel and in opposite directions, and the optical touch device comprises three reflective optical units disposed on the other three corners of the display panel for reflecting the plurality of beams travelling in parallel and in the opposite directions.

According to the disclosure, the optical touch device includes a plurality of optical transceivers for transceiving the plurality of beams travelling in parallel and in opposite directions.

According to the disclosure, the optical touch device includes two image capturing modules respectively installed on two corners of the same side of the display panel.

According to the disclosure, each image capturing module is an image sensor.

According to the disclosure, the control module does not calculate the coordinate value of the object when the control module determines that the object does not block the optical virtual frame.

The optical touch device of the present invention utilizes the optical virtual frame as a background when the object is located within the coordinate detecting area, and there is no need to utilize a substantial reflective frame or a substantial non-reflective frame. It can achieve a purpose of filtering out the object not located within the coordinate detecting area. As a result, it can overcome the assembly difficulty, reduce manufacturing cost, and have the accurate determination of the touch object with image processing.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
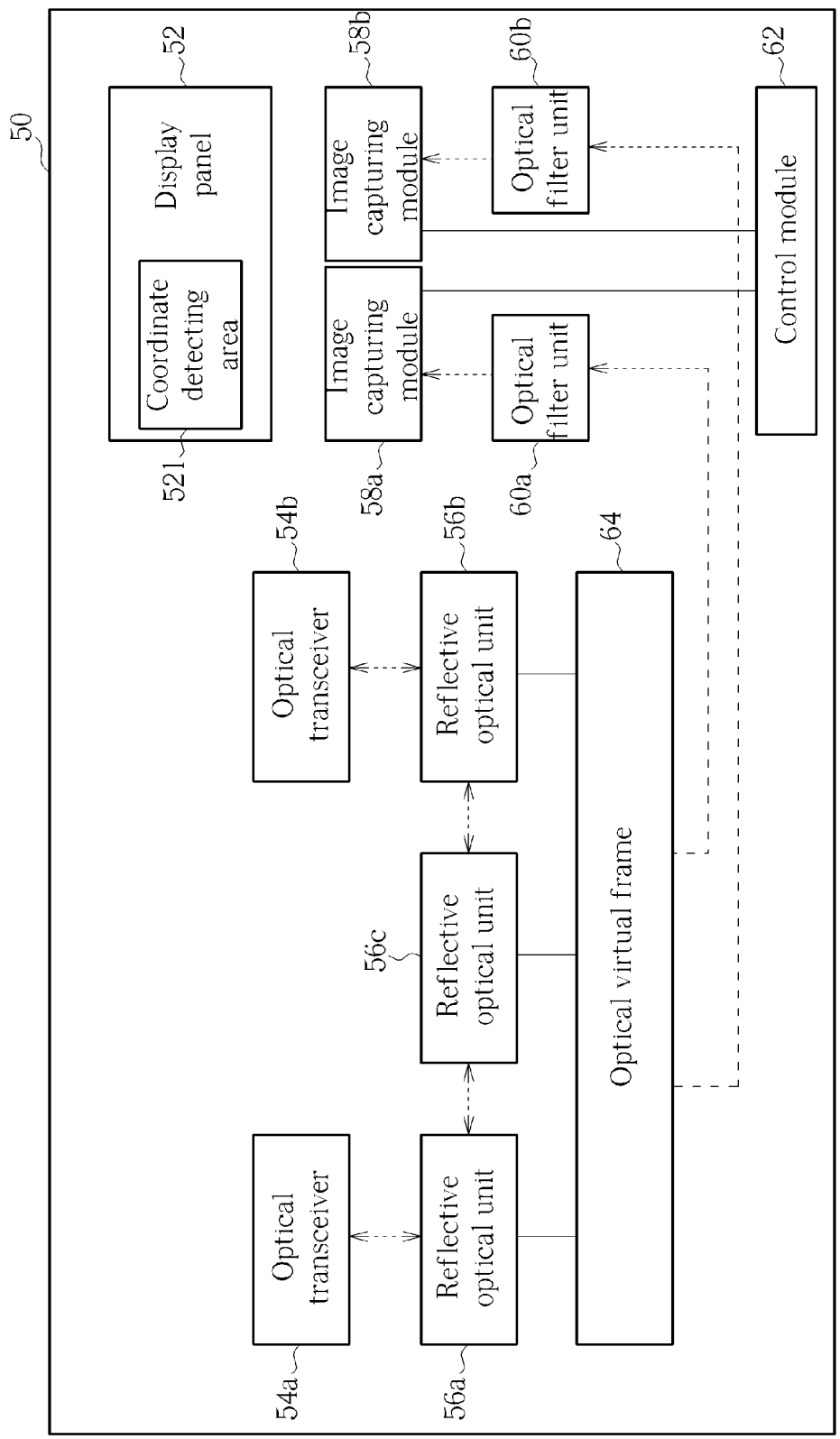
FIG. 1 is a functional block diagram of an optical touch device according to an embodiment of the present invention.
Figure 2:
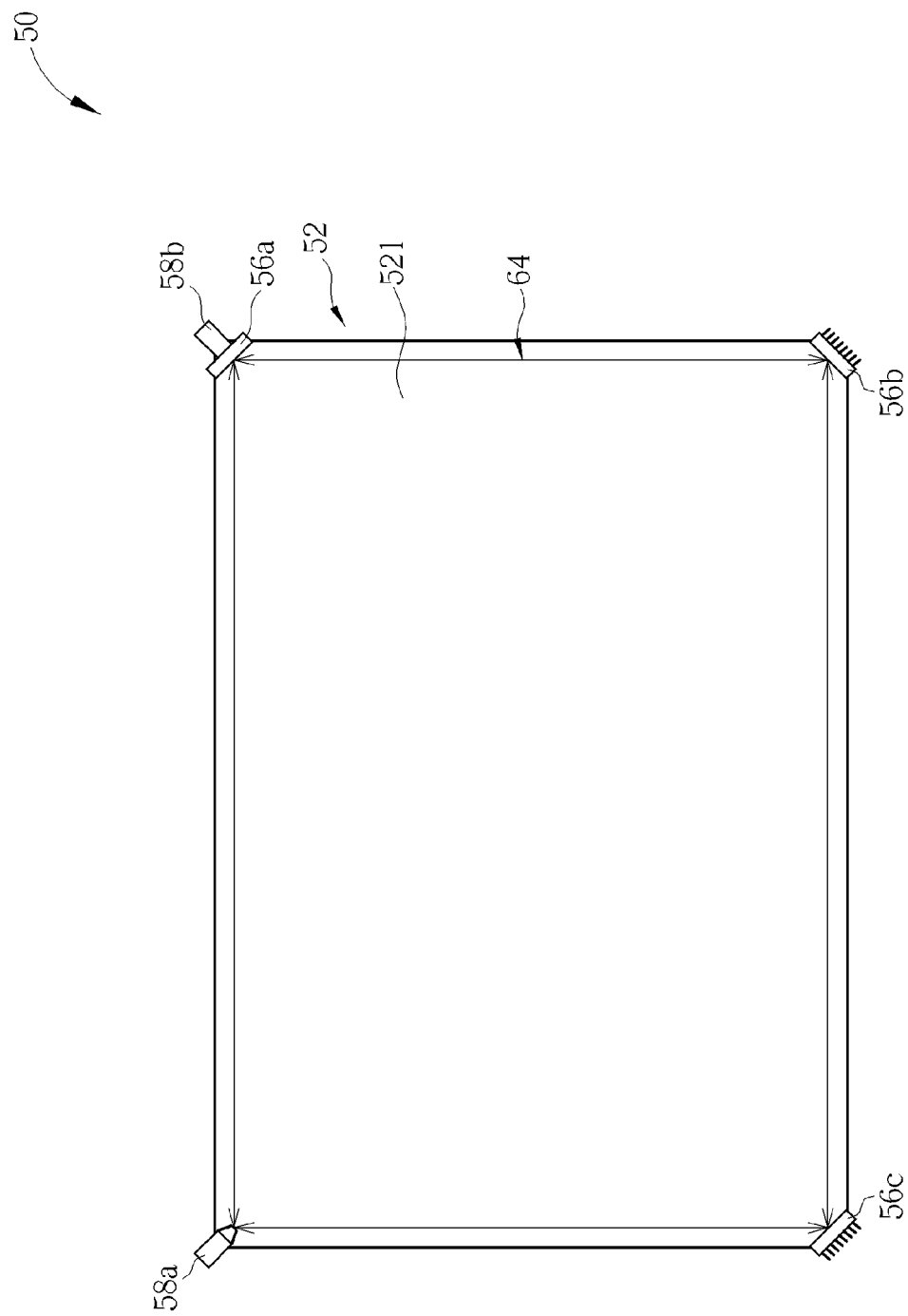
FIG. 2 is a front view of the optical touch device according to the embodiment of the present invention.
Figure 3:
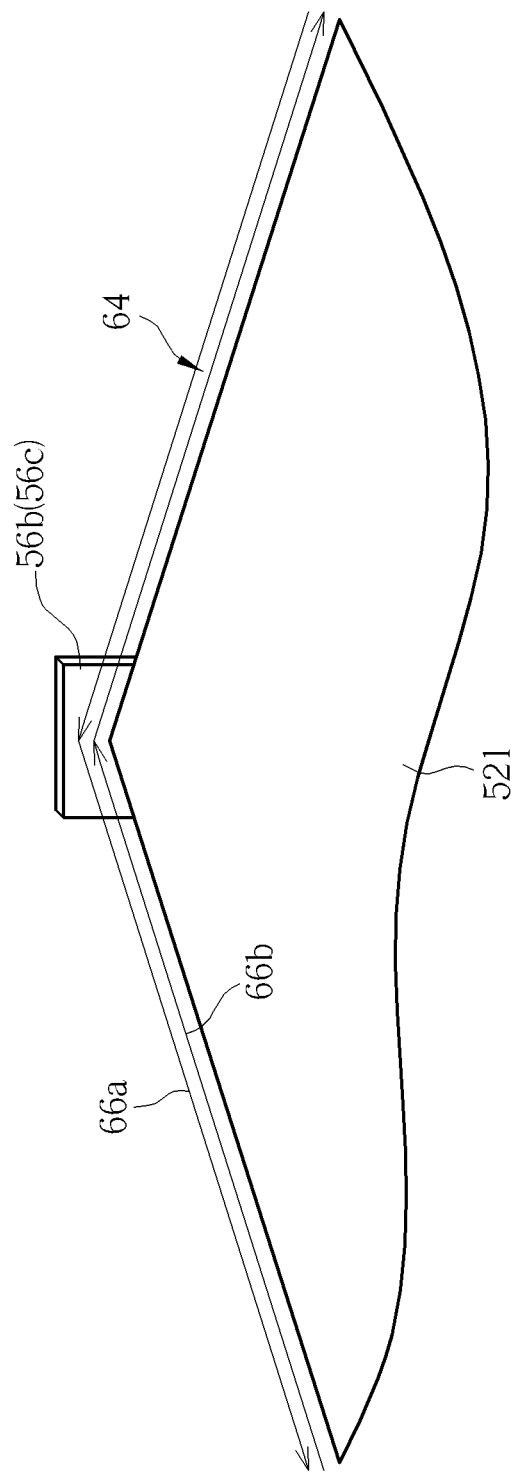
FIG. 3 to FIG. 5 are respectively side views in different portions of the optical touch device according to the embodiment of the present invention.
Figure 4:
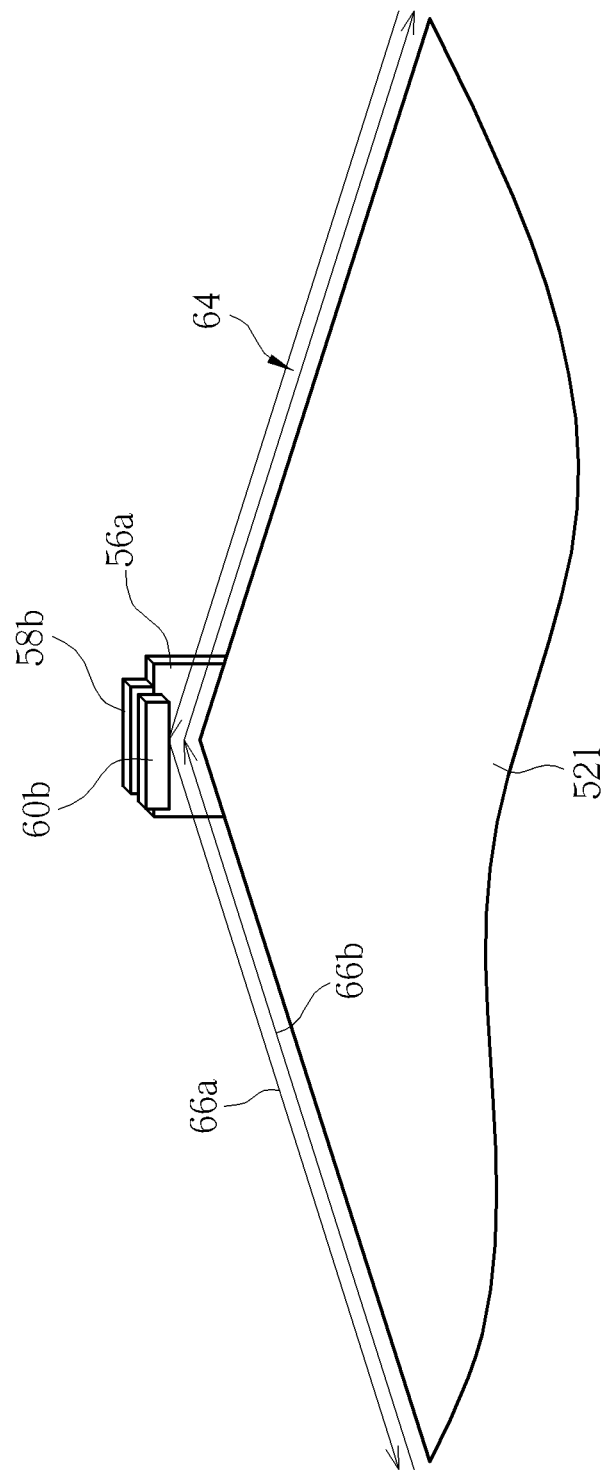
Figure 5:
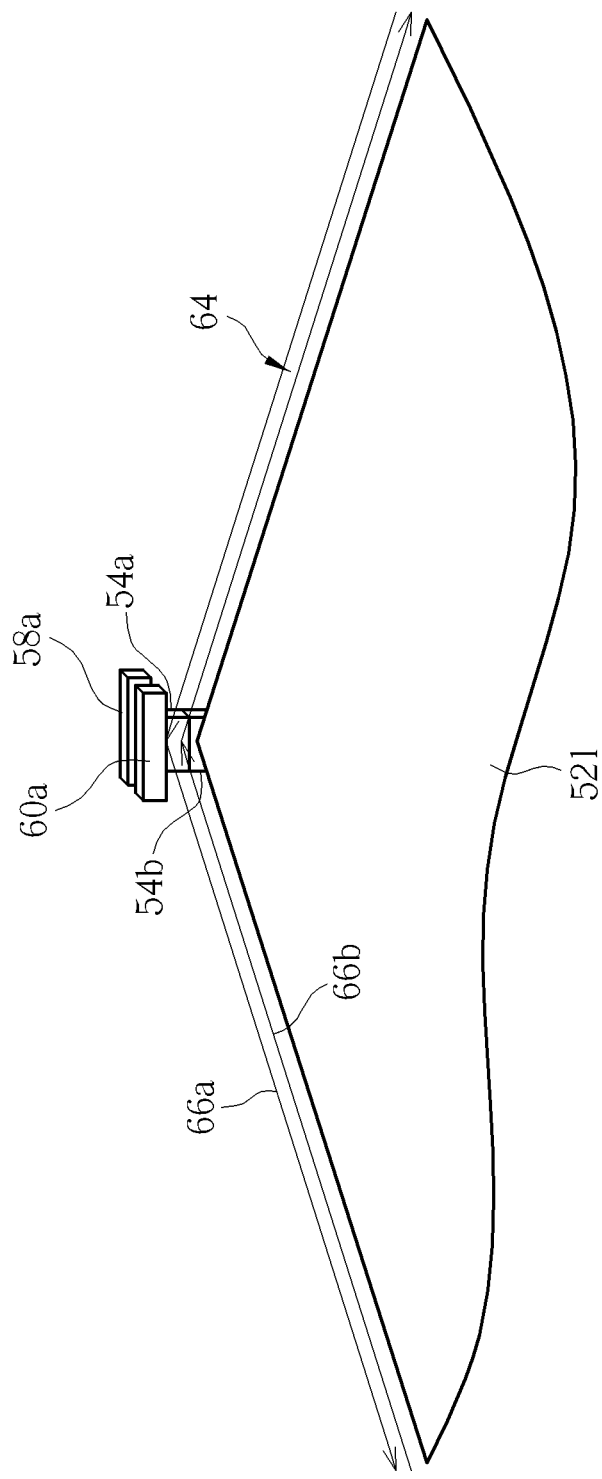

Please refer to FIG. 1 to FIG. 5. FIG. 1 is a functional block diagram of an optical touch device 50 according to an embodiment of the present invention. FIG. 2 is a front view of the optical touch device 50 according to the embodiment of the present invention. FIG. 3 to FIG. 5 are respectively side views in different portions of the optical touch device 50 according to the embodiment of the present invention. The optical touch device 50 includes a display panel 52, two optical transceivers 54a, 54b, three reflective optical units 56a, 56b, 56c, two image capturing modules 58a, 58b, two optical filter units 60a, 60b, and a control module 62. The display panel 52 can be a touch panel whereon a coordinate detecting area 521 is formed. The two optical transceivers 54a, 54b are disposed on a corner of the display panel 52 for transceiving a plurality of beams travelling in parallel and in opposite directions so as to form an optical virtual frame 64. The plurality of beams travelling in opposite directions can ensure the optical virtual frame 64 against interruption as one finger blocks the beams (such as that the finger is on the optical virtual frame 64), and another finger lacks a beam background in a multi-touch operation. For example, the optical transceivers 54a, 54b can respectively emit two beams 66a, 66b travelling in parallel and in opposite directions to build the optical virtual frame 64. The optical transceivers 54a, 54b can be a laser transceiver or an infrared transceiver for transceiving straight light beams, respectively.

Moreover, three reflective optical units 56a, 56b, 56c are disposed at another three corners of the display panel 52 and on an optical path of the optical virtual frame 64. The reflective optical units 56a, 56b, 56c are used for reflecting the plurality of beams travelling in parallel and in the opposite directions so that the beams 66a, 66b can travel back to the optical transceivers 54a, 54b after three reflections. Positions and amounts of the optical transceivers and reflective optical units are not limited to this embodiment. For example, in this embodiment, because the two optical transceivers 54a, 54b are disposed at the same corner of the display panel 52, the three reflective optical units 56a, 56b, 56c need to be disposed at the other three corners of the display panel 52. If the two optical transceivers 54a, 54b are disposed at different corners of the display panel 52, it will need four reflective optical units to be disposed at four corners of the display panel 52. In addition, it also can be implemented that only one set of optical transceiver is disposed at a corner of the display panel 52, and three reflective optical units are disposed at the other three corners of the display panel 52. Besides, it also can be implemented that four sets of optical transceivers are disposed at four corners of the display panel 52 and for respectively transceiving the plurality of beams travelling in parallel and in the opposite directions, so as to form a corresponding optical virtual frame. Besides, only one set of optical transceiver can be disposed and no reflective optical unit is utilized, and a splitter (such as a prism) is used for splitting one single beam generated by the optical transceiver into a plurality of beams. In conclusion, any mechanism capable of building an optical virtual frame at the outside of the coordinate detecting area 521 of the display panel 52 is within the scope of the present invention, and it depends on practical design demand.

Moreover, the two image capturing modules 58a, 58b can respectively installed at different corners of the same side of the display panel 52. For example, as shown in FIG. 3 and FIG. 4, the two reflective optical units 56b, 56c can be separately disposed at two corners, and the other reflective optical units 56a can be disposed under the image capturing modules 58b. As shown in FIG. 5, the two optical transceivers 54a, 54b can be disposed under the image capturing modules 58a. Relative positions of the image capturing modules, the reflective optical units and the optical transceivers are not limited to this embodiment and depend on practical design. Besides, the image capturing modules 58a, 58b are used for capturing surroundings of an object. The image capturing modules 58a, 58b can be an image sensor such as a camera and so on. The two optical filter units 60a, 60b are respectively disposed at positions corresponding to the image capturing modules 58a, 58b. The two optical filter units 60a, 60b are used for filtering beams travelling into the image capturing modules 58a, 58b so that the image capturing modules 58a, 58b capture the beams with the same wavelength as a wavelength of the beams 66a, 66b transceived from the optical transceivers 54a, 54b. For example, the optical filter units 60a, 60b can filter the beam with the same wavelength as a wavelength of a laser beam or an infrared beam so as to provide the image capturing modules 58a, 58b with corresponding beams. The optical filter units 60a, 60b can be integrated with the image capturing modules 58a, 58b, and it depends on practical design.

The control module 62 is coupled to the image capturing modules 58a, 58b and for determining whether the object blocks the optical virtual frame 64 according to the surroundings captured by the image capturing modules 58a, 58b. And then the control module 62 determines whether to calculate a coordinate value of the object according to the result of determination. In addition, the display panel 52, the two optical transceivers 54a, 54b, the three reflective optical units 56a, 56b, 56c, the two image capturing modules 58a, 58b, the two optical filter units 60a, 60b and the control module 62 can be integrated within the same display, such as being within a monitor or an All In One PC and so on. Alternatively, the two optical transceivers 54a, 54b, the three reflective optical units 56a, 56b, 56c, the two image capturing modules 58a, 58b, the two optical filter units 60a, 60b and the control module 62 also can be modularized separately, such as hanging on a frame of the display panel 52, and the coordinate detecting area 521 can correspond to a transparent panel on the frame, so as to be detachably installed on the different display panels 52.

Figure 6:
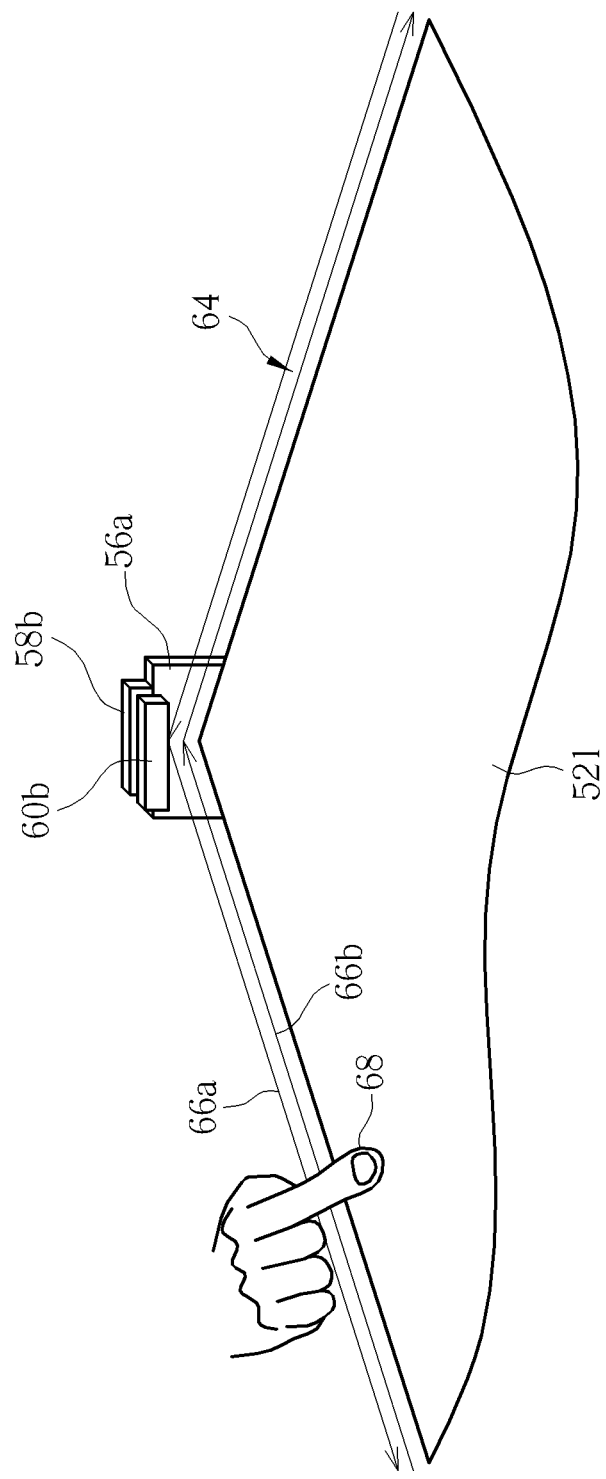
FIG. 6 and FIG. 7 are respectively showing an object inside and outside a coordinate detecting area according to the embodiment of the present invention.
Figure 7:
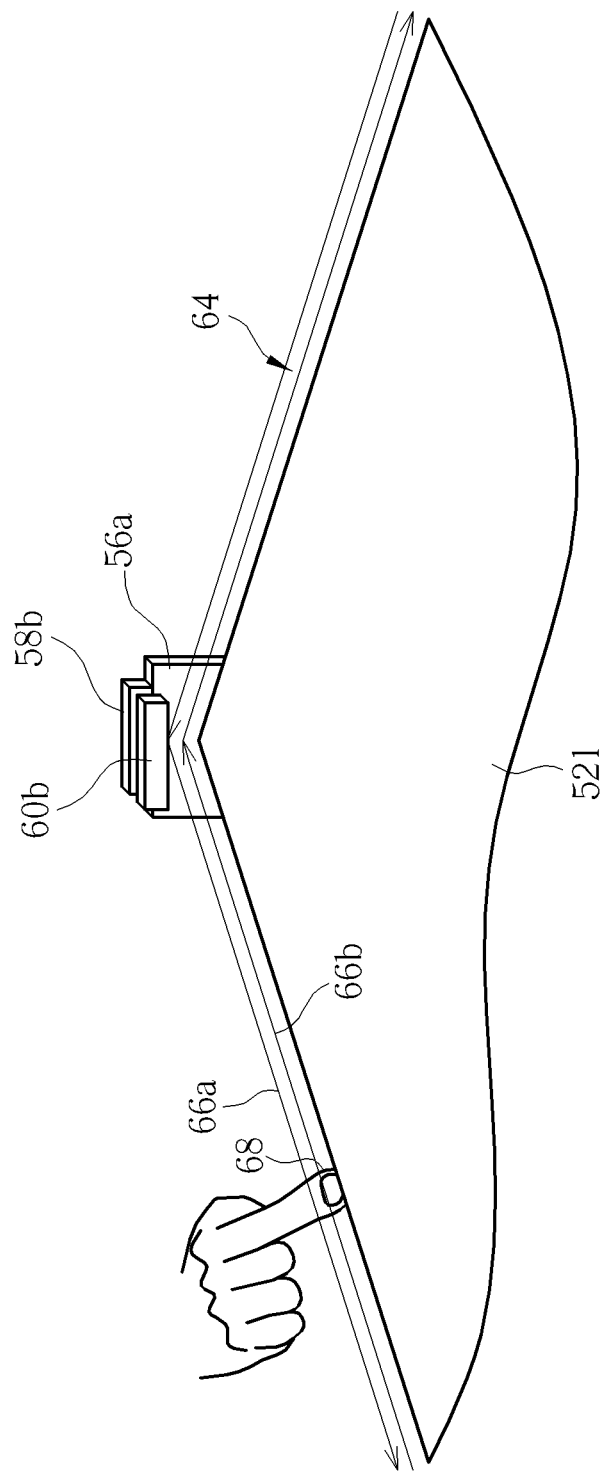

In order to implement the optical touch device 50, users can perform touch operation within the coordinate detecting area 521, such as moving fingers within the coordinate detecting area 521. Please refer to FIG. 6 and FIG. 7. FIG. 6 and FIG. 7 are respectively showing an object 68 inside and outside the coordinate detecting area 521 according to the embodiment of the present invention. As shown in FIG. 6, when the object 68 is located within the coordinate detecting area 521, the object 68 partly blocks the beams 66a, 66b of the optical virtual frame 64. When the object 68 is located on the optical virtual frame 64, the object 68 blocks the beams 66a, 66b, so that the beams 66a, 66b can not travel forward. The image capturing modules 58a, 58b respectively capture surroundings of the object 68 and transfer corresponding image data to the control module 62. And then the control module 62 determines whether the object 68 blocks the optical virtual frame 64 according to the surroundings of the object 68 captured by the image capturing module 58a, 58b.

When the control module 62 determines that the object 68 blocks the optical virtual frame 64, the control module 62 calculates the coordinate value of the object 68. For example, the control module 62 can determine a corresponding part of the optical virtual frame 64 which the object 68 blocks and perform image processing analysis for the surroundings of the object 68, such as noise reduction, and then perform coordinate transformation of the processed image information, such as getting the position of the objects 68 according to the included angles between the images captured by the image capturing module 58a, 58b and axes by triangulating location, so as to get the corresponding coordinate values. And then it provides the host computer with a basis to perform the related touch operation. On the contrary, as shown in FIG. 7, because the object 68 is located outside the coordinate detecting area 521, the object 68 cannot block the beams 66a, 66b of the optical virtual frame 64, so that the control module 62 determines that the object 68 does not block the optical virtual frame 64. Accordingly, the control module 62 does not calculate the coordinate value of the object 68 and does not perform corresponding touch operation. It means that the object 68 is not located within the coordinate detecting area 521 so as to filter out unnecessary calculation of objects for effectively conserve system resources.

In contrast to the prior art, the optical touch device of the present invention utilizes the optical virtual frame as a background when the object is located within the coordinate detecting area, and there is no need to utilize a substantial reflective frame or a substantial non-reflective frame. It can achieve a purpose of filtering out the object not located within the coordinate detecting area. As a result, it can overcome the assembly difficulty, reduce manufacturing cost, and have the accurate determination of the touch object with image processing.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical touch device comprising:
    a display panel whereon a coordinate detecting area is formed;
    at least one optical transceiver disposed on a corner of the display panel for transceiving a plurality of beams travelling along an edge of the coordinate detecting area so as to form an optical virtual frame around the display panel;
    at least one image capturing module disposed on a corner of the display panel for capturing surroundings of an object without receiving any light reflected from a reflective frame or a non-reflective frame; and
    a control module coupled to the at least one image capturing module for determining whether to calculate a coordinate value of the object according to whether the object blocks the optical virtual frame by the captured surroundings of the object.

2. The optical touch device of claim 1, wherein the at least one optical transceiver is a laser transceiver or an infrared transceiver for transceiving straight light beams.

3. The optical touch device of claim 2, further comprising at least one optical filter unit disposed on a position corresponding to the at least one image capturing module for filtering beams traveling into the at least one image capturing module so that the at least one image capturing module captures the beams with the same wavelength as a wavelength of the beams emitted from the at least one optical transceiver.

4. The optical touch device of claim 3, wherein the control module calculates the coordinate value of the object when the control module determines that the object blocks the optical virtual frame.

5. The optical touch device of claim 3, further comprising at least one reflective optical unit disposed on an optical path of the optical virtual frame for reflecting the beams emitted from the at least one optical transceiver back to the at least one optical transceiver.

6. The optical touch device of claim 5, wherein the optical touch device comprises two optical transceivers disposed on the corner of the display panel for transceiving the plurality of beams travelling in parallel and in opposite directions, and the optical touch device comprises three reflective optical units disposed on the other three corners of the display panel for reflecting the plurality of beams travelling in parallel and in the opposite directions.

7. The optical touch device of claim 3, wherein the optical touch device comprises a plurality of optical transceivers for transceiving the plurality of beams travelling in parallel and in opposite directions.

8. The optical touch device of claim 3, wherein the optical touch device comprises two image capturing modules respectively installed on two corners of the same side of the display panel.

9. The optical touch device of claim 3, wherein each image capturing module is an image sensor.

10. The optical touch device of claim 1, wherein the control module calculates the coordinate value of the object when the control module determines that the object blocks the optical virtual frame.

11. The optical touch device of claim 1, further comprising at least one reflective optical unit disposed on an optical path of the optical virtual frame for reflecting the beams emitted from the at least one optical transceiver back to the at least one optical transceiver.

12. The optical touch device of claim 11, wherein the optical touch device comprises two optical transceivers disposed on the corner of the display panel for transceiving the plurality of beams travelling in parallel and in opposite directions, and the optical touch device comprises three reflective optical units disposed on the other three corners of the display panel for reflecting the plurality of beams travelling in parallel and in the opposite directions.

13. The optical touch device of claim 1, wherein the optical touch device comprises a plurality of optical transceivers for transceiving the plurality of beams travelling in parallel and in opposite directions.

14. The optical touch device of claim 1, wherein the optical touch device comprises two image capturing modules respectively installed on two corners of the same side of the display panel.

15. The optical touch device of claim 1, wherein each image capturing module is an image sensor.

16. The optical touch device of claim 1, wherein the control module does not calculate the coordinate value of the object when the control module determines that the object does not block the optical virtual frame.

17. The optical touch device of claim 16, further comprising at least one reflective optical unit disposed on an optical path of the optical virtual frame for reflecting the beams emitted from the at least one optical transceiver back to the at least one optical transceiver.

18. The optical touch device of claim 16, wherein the optical touch device comprises two optical transceivers disposed on the corner of the display panel for transceiving the plurality of beams travelling in parallel and in opposite directions, and the optical touch device comprises three reflective optical units disposed on the other three corners of the display panel for reflecting the plurality of beams travelling in parallel and in the opposite directions.

19. The optical touch device of claim 16, wherein the optical touch device comprises a plurality of optical transceivers for transceiving the plurality of beams travelling in parallel and in opposite directions.

20. The optical touch device of claim 16, wherein the optical touch device comprises two image capturing modules respectively installed on two corners of the same side of the display panel.

* * * * *

UNITED STATES PATENT AND TRADEMARK OFFICE
CERTIFICATE OF CORRECTION

| | | |
|---|---|---|
| PATENT NO. | : 8,922,528 B2 | Page 1 of 1 |
| APPLICATION NO. | : 13/604611 | |
| DATED | : December 30, 2014 | |
| INVENTOR(S) | : Chia-Te Chou | |

It is certified that error appears in the above-identified patent and that said Letters Patent is hereby corrected as shown below:

On the title page, item (73), correct the name of the assignee from "Winston Corporation" to --Wistron Corporation--.

On the title page, item (73), correct the residence of the assignee from "Hsinchih, New Taipei (TW)" to --Hsichih, New Taipei (TW)--.

Signed and Sealed this
Twenty-eighth Day of April, 2015

Michelle K. Lee
*Director of the United States Patent and Trademark Office*